United States Patent [19]
Vasic et al.

[11] Patent Number: 5,963,536
[45] Date of Patent: Oct. 5, 1999

[54] COPY COUNT PROTECTION STRUCTURE FOR OPTICAL RECORDING MEDIUM AND METHOD FOR SAME

[75] Inventors: Bane V. Vasic; Timothy J. Whitcher, both of Rochester; Yuan-Sheng Tyan, Webster; Randall H. Victora, Rochester, all of N.Y.

[73] Assignee: Eastman Kodak Company, Rochester, N.Y.

[21] Appl. No.: 08/962,940

[22] Filed: Oct. 28, 1997

Related U.S. Application Data

[60] Provisional application No. 60/041,863, Apr. 8, 1997.

[51] Int. Cl.⁶ .................................................. G11B 7/24
[52] U.S. Cl. ........................ 369/275.3; 369/54; 428/64.1
[58] Field of Search ............................ 369/275.3, 275.1, 369/275.4, 283, 284, 288, 275.2, 59, 47, 32, 54, 60, 48, 50, 58; 428/64.1, 64.2, 64.4, 64.7; 360/48

[56] References Cited

U.S. PATENT DOCUMENTS

| | | | |
|---|---|---|---|
| 4,940,618 | 7/1990 | Hamada et al. | 428/64.7 |
| 5,271,978 | 12/1993 | Vazan et al. | 428/64.4 |
| 5,274,623 | 12/1993 | Usami et al. | 369/275.1 |
| 5,326,677 | 7/1994 | Fleming et al. | 430/367 |
| 5,430,281 | 7/1995 | Lentz et al. | 235/454 |
| 5,489,768 | 2/1996 | Brownstein et al. | 235/414 |
| 5,572,589 | 11/1996 | Waters et al. | 380/4 |
| 5,805,551 | 9/1998 | Oshima et al. | 369/59 |
| 5,807,640 | 9/1998 | Ueno et al. | 428/64.1 |

*Primary Examiner*—Ali Neyzari
*Attorney, Agent, or Firm*—Raymond L. Owens

[57] ABSTRACT

An optical recording medium comprising a first substrate with a center mounting hole and having top and bottom surfaces. At least one surface of the substrate is a prerecorded area wherein user data is provided and adapted to be read in an optical recording medium reader device. Over at least a portion of the substrate that can be read by the device is a photosensitive layer comprising a photosensitive material. When the photosensitive material is exposed to a predefined wavelength of light over a predetermined period of time the optical property of at least a portion of the material permanently changes. This change occurs after each copy of the prerecorded area is made. Thereby, the optical recording medium limits the authorized copies of the prerecorded area to a predetermined number.

48 Claims, 6 Drawing Sheets

COPY COUNT PROTECTION STRUCTURE FOR OPTICAL RECORDING MEDIUM AND METHOD FOR SAME

CROSS REFERENCE TO RELATED APPLICATION

This application claims the benefit of U.S. Provisional Application No. 60/041,863, filed Apr. 8, 1997.

FIELD OF THE INVENTION

The present invention relates to an optical recording medium, and more particularly, to an optical recording medium that can prevent unauthorized reading or copying of user data from the medium.

BACKGROUND OF THE INVENTION

Optical disks are widely used as storage media. A CD-ROM optical disk is typically manufactured in accordance with published standards and has prerecorded information. A problem with CD-ROM optical disks is that it is often desired to limit the number of copies that can be made. For example, after the disk is used, the user may copy the information recorded on the disk to a second disk and give the second disk to another user. The disk manufacturer often wants to restrict this type of usage.

One method for disk copy protection uses a hardware key or a special data disk referred to as a key disk for the protection. However, that method requires an additional medium for carrying the key in the form of additional hardware or a separate disk. In addition, that method can make usage of the recording medium impossible if the hardware key or the key disk breaks, or the key disk is misplaced.

U.S. Pat. No. 5,572,589 discloses an alternative technique for optical disk copy protection. That technique requires serializing disks by physically damaging a portion of the optical disk to create a pattern of damage. The pattern of damage is encoded in an identifying value, and the disk is marked with the identifying value to distinguish an authorized optical disk from an unauthorized disk. A drawback to that technique is that it requires sacrificing disk capacity by damaging useful recording area.

Another approach to provide disk copy protection is to record a copy protection code on an optical disk so the code cannot be scanned by an optical head, and to use this code as a key to encrypt the user data before encoding. For example, U.S. Pat. No. 5,274,623 discloses an optical disk having information recorded in a recording area on a top surface of the disk. Copy protection information is recorded on the outer peripheral edge of the optical disk in the form of a serrated pattern perpendicular to the surface of the recording layer.

A further technique to provide disk copy protection is the use of a disk identification number, preferably in the form of a bar code. This technique is disclosed in commonly-assigned U.S. Pat. No. 5,430,281. In addition, commonly-assigned U.S. Pat. No. 5,489,768 discloses an optical disk having bar codes used to prevent storing inappropriate files on the disk by preventing an unauthorized system to interact with the disk.

A problem with previous approaches and techniques is that copy protection information on an optical disk does not fully prevent unauthorized copying of data from the optical disk. Users can often subvert the unauthorized copy feature and make unauthorized copies of the optical disk.

Accordingly, it is an object of the present invention to provide an optical recording medium, such as an optical disk, that can prevent unauthorized reading or copying of data stored on the medium.

SUMMARY OF THE INVENTION

An optical recording medium comprising a first substrate with a center mounting hole and having top and bottom surfaces. At least one surface of the substrate is a prerecorded area wherein user data is provided and adapted to be read in an optical recording medium reader device. Over at least a portion of the substrate that can be read by the device is a photosensitive layer comprising a photosensitive material. When the photosensitive material is exposed to a predefined wavelength of light over a predetermined period of time with a predetermined intensity, the optical property of at least a portion of the material permanently changes. This change occurs after each copy of the prerecorded area is made. Thereby, the optical recording medium limits the authorized copies of the prerecorded area to a predetermined number.

DETAILED DESCRIPTION OF THE INVENTION

Figure 1:
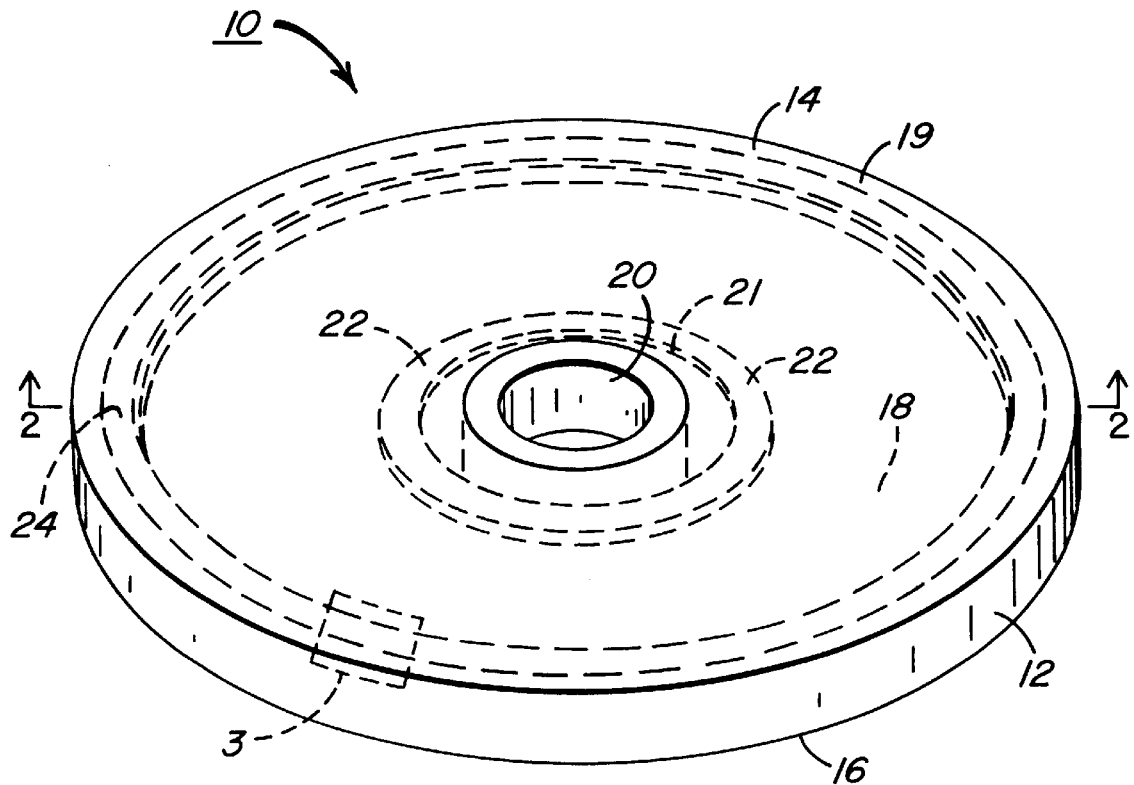
FIG. 1 is a diagram of an optical recording medium in accordance with the present invention.

Referring to FIG. 1, an optical recording medium for preventing unauthorized copying of prerecorded data from the medium is shown in accordance with the present invention. The optical recording medium 10, preferably in the shape of a disk, comprises a substrate 12 having a top surface 14 and a bottom surface 16. Preferably, substrate 12 is formed from molded plastic, with polycarbonate being a preferred material. Substrate 12 has a prerecorded area 18 wherein user data is provided and adapted to be read, a conventional lead-in area 19, a center mounting hole 20 that permits substrate 12 to be mounted in an optical recording medium reader (not shown), and a conventional lead-out area 21. Optionally, substrate 12 can have an identification area 22 as incorporated by reference in commonly-assigned U.S. Pat. No. 5,430,281 and a copy count area 24.

Figure 2:
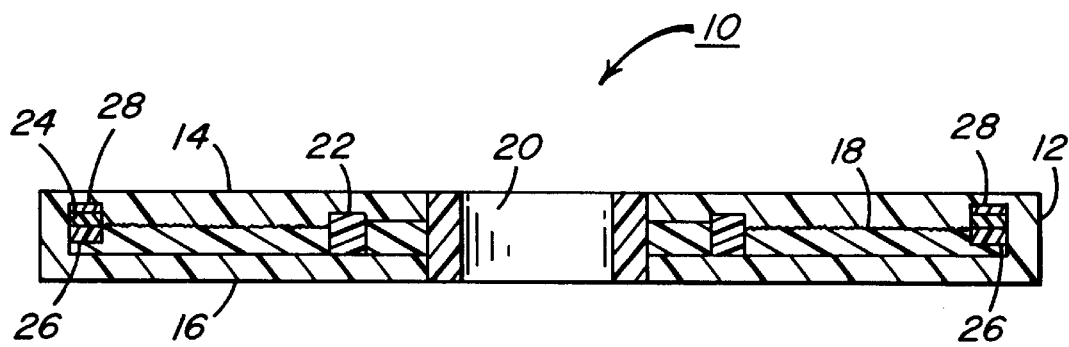
FIG. 2 is a cross-sectional view of the optical recording medium of FIG. 1 taken along the lines 2—2.

Referring now to FIG. 2, a cross-sectional view of the optical recording medium 10 of FIG. 1 taken along the lines 2—2 is shown. Substrate 12 is formed to include embossed pits on substrate 12 to form prerecorded area 18 if medium 10 is a compact disk (CD)-read only memory (ROM) or a digital versatile disk (DVD)-ROM having a metalized top surface. These embossed pits in prerecorded area 18 convey information commonly referred to as user data. User data is formed differently in other types of medium 10 that can be utilized in the present invention. For example, in a CD-recordable (R) or DVD-R the user data can be written once and never modified. While a CD-rewriteable (RW) or DVD-RW allows the user data to be continuously modified. Other information may also be found on substrate 12.

Optionally, identification area 22 can provide additional optical recording medium copy protection. Area 22 provides an identification number that is in the form of a bar code, as disclosed in commonly-assigned U.S. Pat. No. 5,430,281, incorporated by reference herein. In addition, commonly-assigned U.S. Pat. No. 5,489,768, incorporated by reference herein, discloses an identification area 22 having bar codes used to prevent inappropriate files from being stored on medium 10 by preventing an unauthorized system from attempting to interact with medium 10.

Copy count area 24 has information regarding the number of authorized copies of the user data (commonly referred to as copy count information). As shown in FIGS. 1 and 2, copy count area 24 is near the peripheral edge of substrate 12 but can be any place over a portion of substrate 10 that can be read. In many instances, copy count area is located where it does not interfere with user data, such as where identification area 22 is illustrated in FIGS. 1 and 2.

Copy count area 24, as shown in FIG. 2, comprises a photosensitive layer 26. Photosensitive layer 26 further comprises a photosensitive material. The term "photosensitive material" is used herein to mean any material that when exposed to a predefined wavelength of light over a predetermined period of time permanently changes the optical property of at least a portion of the photosensitive material. The predefined wavelength of light is a relatively low power laser light, such as a read laser light in a conventional optical recording medium reader used to read user data, that illuminates the photosensitive layer 26. In addition, the threshold of activation of the photosensitive material is high enough that light sources with flux lower than the flux of the read laser, such as sunlight, cannot change the optical properties of the photosensitive material. The change in the optical properties of the photosensitive layer 26 produces changes in the reflected light beam that is detectable during subsequent reading of information by the read device.

The photosensitive material forming layer 26 may be a phase change material of the type listed in commonly-assigned U.S. Pat. No. 5,271,978 by Vazan et al, hereby incorporated by reference. That photosensitive material is represented by the formula $(Sb_aSn_bX_c)_{100-d}O_d$ where X is an element selected from the group consisting of indium, germanium, aluminum, and zinc; O is oxygen; and d is between 0 and 10; a is between 0.30 and 0.98; b is between 0.0 and 0.48; and c is between 0.02 and 0.60. For example, an amorphous alloy consisting essentially of 70% antimony, 15% tin, and 15% indium has been found to change under repeated exposure to 635 nm laser light, yet shows good resistance to more moderate intensities of light such as sunlight. A film of this material would be typically deposited by sputtering.

Other photosensitive materials may be substantially transparent. In this case, it may be advantageous to place a reflector layer 28 over the top of the photosensitive material. For example, a mixture of germanium, tellurium, and methane has been overcoated with a highly reflective metal layer, such as gold, to yield a highly reflective structure. The photosensitive material is represented by the formula $Te_aGe_bC_cH_dO_e$ wherein a, b, c, d, and e are atomic percents and (c+d)>40, d>10, a>5, b>5, and e≧0 such that a+b+c+d+e=100. These materials change under repeated read cycles using 635 nm light. A film of this material would be typically deposited by sputtering a metal alloy target in an atmosphere containing a hydrocarbon such as methane.

In general, it is expected that there are many additional materials that exhibit a threshold for recording that is commensurate with damage from repeated exposure to the intensity of light used during the read operation. Many of these materials react photothermally, e.g., light absorption raises the temperature of the material sufficiently to produce structural changes in the material. For example, some dyes such as cyanines and tellurium leuco dyes have this property. General descriptions of these classes of dyes are given in U.S. Pat. Nos. 4,940,618 and 5,326,677 respectively. A typical method of deposition of these dyes would be spin coating. The use of a reflective layer 28 over the top of these dyes increases the reflectivity.

Figure 3:
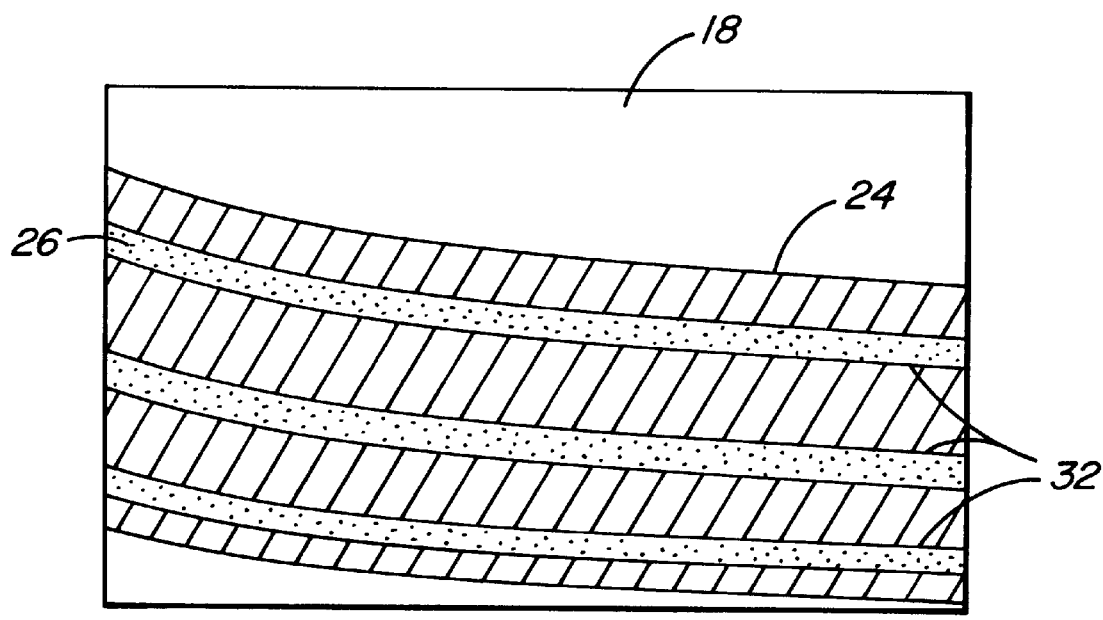
FIG. 3 is an enlarged view of the optical recording medium of FIG. 1 taken from box 3.

Turning to FIG. 3, a top view of the optical recording medium 10 of FIG. 1 taken from box 3 is shown. In this embodiment, photosensitive layer 26 is at least one ring 32 in copy count area 24. Each ring 32 or portion of ring 32 corresponds to one authorized copy of the user data. The photosensitive material in each ring has its optical property changed after the corresponding authorized copy is made.

In an alternative embodiment of FIG. 3, copy count area 24 comprises photosensitive layer 26. After each authorized copy is made, ring 32 or portion of ring 32 is formed by changing the optical property of the photosensitive material. Thereby, the resulting ring 32 indicates an authorized copy was made of medium 10.

Figure 4:
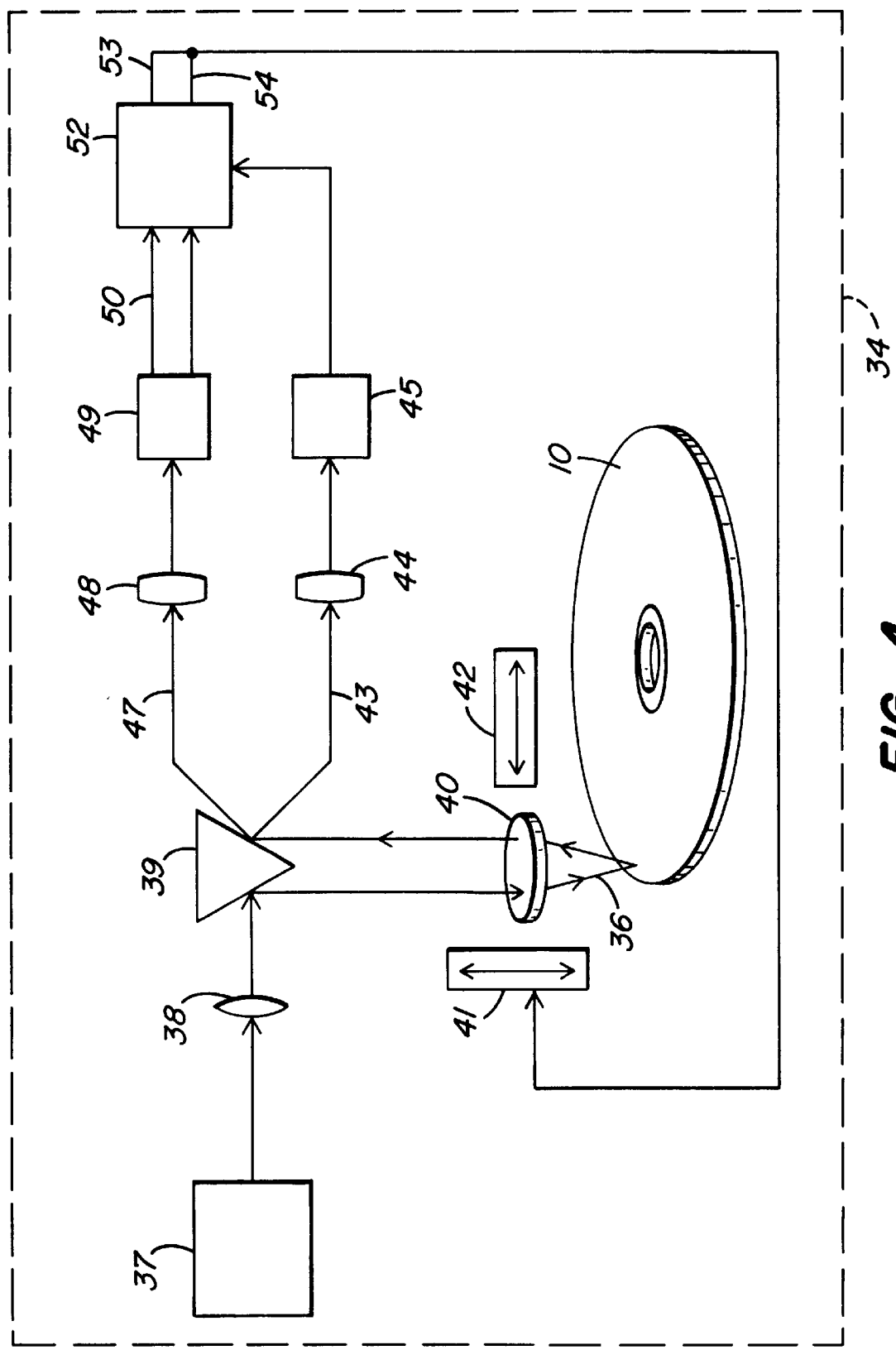
FIG. 4 is a schematic of an optical recording medium reading device for reading user data from the optical recording medium of FIG. 1.

Referring to FIG. 4, an example of a conventional optical recording medium reader device 34 for reading user data from medium 10 in accordance with the present invention is shown. Device 34 includes an optical source 37 for providing a predefined wavelength of light, a read light 36, for reading user data recorded on medium 10. Read light 36 is preferably between 600–700 nm. The optical source 37 can include, for example, a laser or laser diode (not shown) and a controller (not shown) to eventually form read light 36. Read light 36 from optical source 37 is colliminated by a collimating lens 38 and directed to a beam splitter 39. Read light 36 passes through beam splitter 39 and is focused by an objective lens 40 onto medium 10 while medium 10 is rotating. Objective lens 40 is mounted to an optical actuator 41 that adjusts the position of objective lens 40 to maintain read light 36 from optical source 37 in focus and on track. A carriage assembly 42 typically provides cross-track movement of the optical spot on surface 14.

As with any conventional reader device 34, read light 36 reflected from medium 10 is recollimated by objective lens 40 and is directed to beam splitter 39. A first portion 43 of the reflected light 36, for example, 90 percent, is directed by beam splitter 39 in a first direction to a data focusing lens 44. Data focusing lens 44 focuses the first portion 43 of the reflected light 36 onto a data detector 45. Data detector 45 produces a detectable read data signal 46 (RDS) from the reflected light 36 during the reading. A second portion 47 of reflected light 36 is directed by beam splitter 39 in a second direction to a focusing lens 48. Focusing lens 48 focuses the second portion 47 of the reflected light 36 onto a tracking detector 49. Detector 49 produces a focus error signal 50 (FES) and a tracking error signal 51 (TES). Detector 49 and data detector 45 each can be a device capable of detecting incident optical radiation, such as a positive-intrinsic-negative photodiode or an avalanche photodiode.

FES 50 and TES 51 are sent to a control unit 52 that produces a focus control signal 53 (FCS) and a tracking control signal 54 (TCS) in response to the FES and TES, respectively. The FCS and TCS are used by the actuator to control the position of the actuator on carriage assembly 39 in the focus and tracking directions, respectively, in order to maintain read light 36 in focus and on track during reading of medium 10.

While reading medium 10 device 34 initially reads conventional lead-in area 19 as shown in FIG. 1. Conventional lead-in area 19 provides information to device 34 on how to read medium 10. In this embodiment, lead-in area 19 leads device 34 to first read the section having the copy count information, such as copy count area 24.

A detectable change in the reflected light 36 while reading the copy count information in device 34 should result in a high user data bit 46 error rate and a high tracking error 51 rate and charged intensity of the reflective light. The high data bit 46 error rate and high tracking error 51 rate should inhibit device 34 from reading medium 10 and copying of the user data from medium 10. The high data bit 46 error and high tracking error 51 rate, according to the present invention, is the result of the change in the optical properties of the photosensitive material. The change in optical property acts as an indicator to device 34 that an authorized copy of medium 10 has already been made or that data from medium 10 has already been displayed. In other words, the detectable change in the reflected beam, possibly represented by data errors and tracking errors, is apparent when the maximum authorized copies have been attained.

Figure 5:
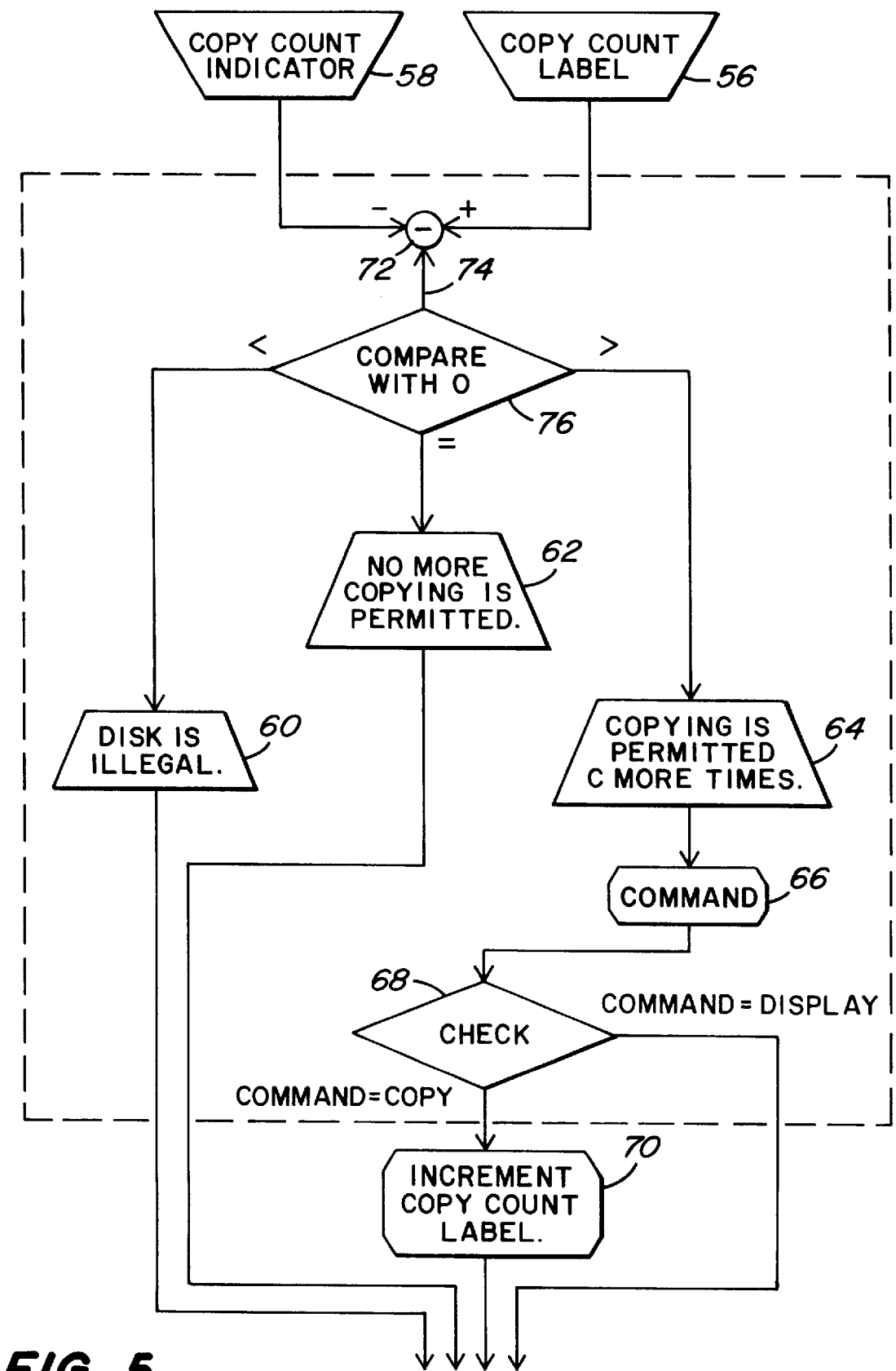
FIG. 5 is a flow diagram of the operation conducted in FIG. 4.

If device 34 finds and correctly reads copy count area 24, device 34 through read data signal 46 can determine the maximum number of authorized copies 56 (hereinafter referred to as "max number") and the number of authorized copies that have already been made 58 (hereinafter referred to as "copy number") disclosed in copy count area 24. Referring to FIG. 5, max number 56 and copy number 58 are sent to control unit 52. Control unit 52 calculates if copy count information is greater than zero by subtracting copy number 58 from max number 56. The difference between copy number 58 and max number 56 represents the number of copies that may still be made form medium 10. If the difference is less than zero that means medium 10 is invalid 60. In contrast, if the difference is equal to zero that means device 34 will not make any further copies 62. If the difference is greater than zero that means device 34 will make authorized copies of medium 10 equal to or less than the difference between max number 56 and copy number 58 (copy authorized 64).

After copy authorized 64 has been determined, the user can submit a command 66 to device 34. Command 66 is examined in a checking device 68, if command 66 is "display" then device 34 displays the user data and if command 66 is "copy" then device 34 must alter the copy count information 70.

After the authorized copy is made, read light 36 is directed to move to copy count area 24 by lead-out area 21 through actuator 41 and carriage assembly 42. The copy count information found in the copy count area 24 is altered by the amount of copies made by changing the optical property of at least a portion of the photosensitive material through a predefined wavelength of light, preferably read light 36, over a predetermined period of time.

EXAMPLE 1

A Digital Versatile Disk (DVD) system and method for reading copy count information is disclosed in FIGS. 4 and 5. Laser beam 36 focuses through lens 40 in an optical head positioned to make a spot on a specific position of copy count area 24. For sake of simplicity of explanation, assume the max number 56 is one, and assume that no copy 58 has been made. Then, during scan process of copy count area 24 device 34 obtains two recorded signal patterns in data signal 46 that contains max number 56 and copy number 58. Max number 56 and copy number 58 are read and compared. If numbers 56, 58 match in more than a predefined number of places, the DVD system concludes that a copy count ring 32 (as shown in FIG. 3) does not exist and that no copy has been made. Otherwise, if ring 32 exists the DVD system concludes that one copy has been made. Copy number 58 is likewise subtracted from max number 56 in a binary Galois field subtractor 72 found in control unit 52 to produce a binary error sequence 74. During reading, the 1s in sequence 74 are counted, resulting in the number of errors signal. The number of errors signal is compared, in decision device 76, with a predefined threshold. If the number of errors signal 74 is larger than the predefined threshold, than a copy count ring is detected. In case when number of authorized copies is greater than one (N>1), detection of all copy count rings is required before copying takes place. In this case the scanning of a copy count area must be performed on different radii corresponding to the positions of different copy count rings.

Electron trapping materials would be particularly suitable for use in optical recording medium 10 meant to be read exactly once. Medium 10 made of this material would be activated by high intensity radiation of a preselected wavelength. It would be interrogated by another preselected wavelength that would cause the material to emit light that would pass through the embossed substrate and be detected. Thus, the data recorded on the substrate would be read. However, scanning the second (read) beam across the surface, without first reactivating the material, would produce only an ordinary reflection that would render the embossed data substantially indecipherable. An example of materials suitable for this application are thin crystalline films of some of the rare-earth doped alkaline-earth metal sulfides.

Figure 6:
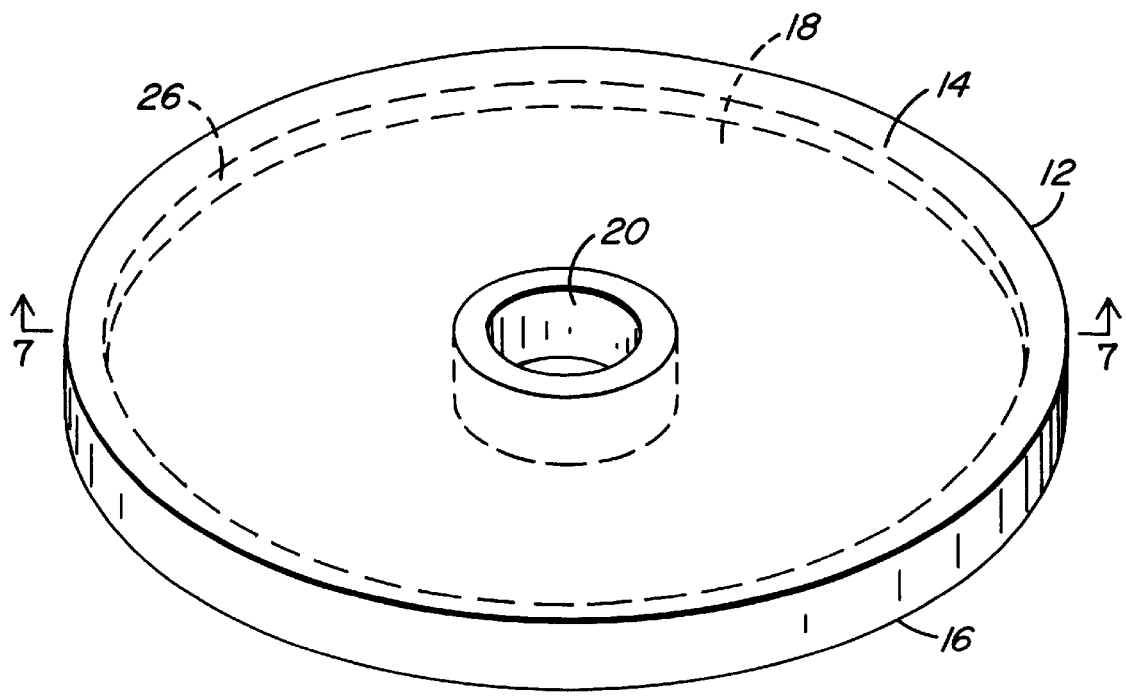
FIG. 6 is an alternative optical recording medium embodiment of FIG. 1.
Figure 7:
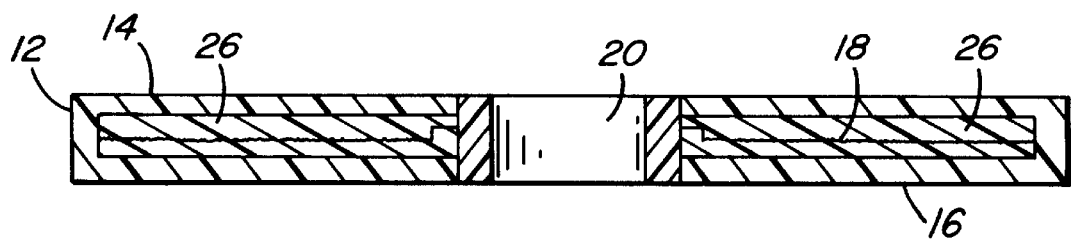
FIG. 7 is a cross-sectional view of the optical recording medium of FIG. 6 taken along the lines 7—7.

Turning to FIGS. 6 and 7, a cross-sectional view of FIG. 6 taken from the line 7—7, there is an embodiment of the present invention designed for only one authorized view or copy of medium 10. Unlike the embodiment illustrated in FIG. 1, the embodiment in FIGS. 6 and 7 has no designated copy count area 24. Rather, the embodiment illustrated in FIGS. 6 and 7 has the photosensitive layer 26 overlaying the prerecorded area 18. Thereby, photosensitive layer 26 is optically changed after one reading and renders medium 10 invalid for further reading or copying.

Figure 8:
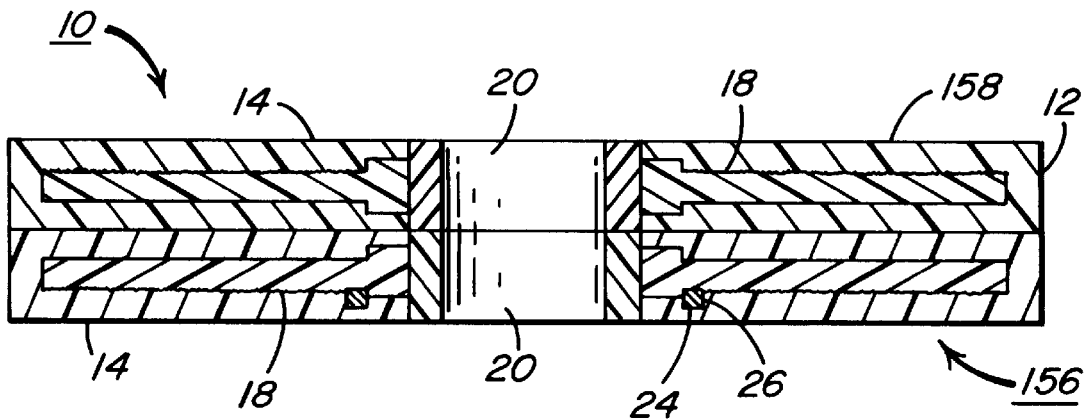
FIG. 8 is an alternative embodiment of FIG. 1.

It would be understood by those skilled in the art, as illustrated in FIG. 8, that although user data can be provided on one surface of medium 10, combining two optical recording mediums 10 and 156 bottom side to bottom side could provide two prerecorded areas 18. Furthermore, one of these mediums 10, 156 could be overcoated with a photosensitive layer 158 and an optional reflective layer of sufficient transparency that both layers of information could be read from the same side, with the laser beam passing through first medium 10 to illuminate second medium 156. These embodiments are particularly useful for some implementations of the Digital Versatile Disk (DVD).

Figure 9:
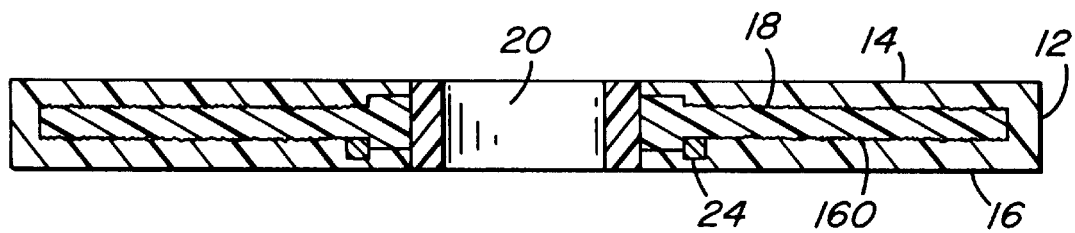
FIG. 9 is an alternative embodiment of FIG. 1.

Additionally, it is understood by those skilled in the art that user data can be provided on top surface 14 at prerecorded area 18 and bottom surface 16 at a recording area 160 as illustrated in FIG. 9.

The invention has been described in detail with particular reference to certain preferred embodiments thereof, but it will be understood that variations and modifications can be effected within the spirit and scope of the invention.

PARTS LIST

| | |
|---|---|
| optical recording medium | 10 |
| substrate | 12 |
| top surface of substrate | 14 |
| bottom surface of substrate | 16 |
| prerecorded area | 18 |
| lead-in area | 19 |
| center mounting hole | 20 |
| lead-out area | 21 |
| identification area | 22 |
| copy count area | 24 |
| photosensitive area | 26 |
| reflector area | 28 |
| ring | 32 |
| optical recording medium reader device | 34 |
| read light | 36 |
| optical source | 37 |
| collimating lens | 38 |
| beam splitter | 39 |
| objective lens | 40 |
| optical actuator | 41 |
| carriage assembly | 42 |
| first portion of reflected light | 43 |
| data focusing lens | 44 |
| data detector | 45 |
| read data signal | 46 |
| second portion of light | 47 |
| focusing lens | 48 |
| tracking detector | 49 |
| focus error signal | 50 |
| tracking error signal | 51 |
| control unit | 52 |
| focus control signal | 53 |
| tracking control signal | 54 |
| max number | 56 |
| copy number | 58 |
| invalid disk | 60 |
| no further copies | 62 |
| copy authorized | 64 |
| command | 66 |
| checking device | 68 |
| altering copy count information | 70 |
| Galois field subtractor | 72 |
| binary error sequence | 74 |
| decision device | 76 |
| second optical recording medium | 156 |
| photosensitive layer | 158 |
| second recording area | 160 |

What is claimed is:

1. An optical recording medium comprising
   a first substrate with a center mounting hole and having top and bottom surfaces;
   a prerecorded area wherein user data is provided and adapted to be read from at least one of said surfaces of the substrate; and
   a photosensitive layer formed over a portion of the substrate and forms at least one ring in a copy count area and a portion of the ring corresponds to an authorized copy comprising a photosensitive material that when exposed to a predefined wavelength of light over a predetermined period of time with a predetermined intensity permanently changes the optical property of at least a portion of the photosensitive layer after each copy of the prerecorded area is made, thereby limiting the authorized copies of the prerecorded area to a predetermined number.

2. The optical recording medium of claim 1 wherein the portion of each ring corresponds to one authorized copy and has the optical property of photosensitive material changed after the corresponding authorized copy is made.

3. The optical recording medium of claim 1 wherein the photosensitive material is represented by the formula $(Sb_aSn_bX_c)_{100-d}O_d$ where X is an element selected from the group consisting of indium, germanium, aluminum, and zinc; O is oxygen; and d is between 0 and 10; a is between 0.30 and 0.98; b is between 0.0 and 0.48; and c is between 0.02 and 0.60.

4. The optical recording medium of claim 1 wherein the photosensitive material is represented by the formula $Te_aGe_bC_cH_dO_e$ wherein a, b, c, d, and e are atomic percents and $(c+d)>40$, $d>10$, $a>5$, $b>5$, and $e \geq 0$ such that $a+b+c+d+e=100$.

5. The optical recording medium of claim 1 wherein the photosensitive material is a dye based material comprising cyanines.

6. The optical recording medium of claim 1 wherein the photosensitive material is a dye based material comprising tellurium leuco dyes.

7. The optical recording medium of claim 1 wherein the photosensitive material is a rare-earth doped alkaline-earth metal sulfide.

8. The optical recording medium of claim 1 further comprising an identification area.

9. The optical recording medium of claim 1 wherein said substrate is a molded plastic.

10. The optical recording medium of claim 9 wherein said molded plastic is polycarbonate.

11. The optical recording medium of claim 1 wherein the photosensitive material is altered photothermally.

12. The optical recording medium of claim 1 wherein a reflective layer is formed over the photosensitive layer.

13. The optical recording medium of claim 1 further comprising a second substrate with a center mounting hole, a prerecorded area wherein user data is provided and adapted to be read from a top surface of the second substrate, and having a bottom surface wherein said bottom surfaces and mounting holes of said first substrate and said second substrate are aligned and mounted together.

14. The optical recording medium of claim 1 further comprising a plastic transparent layer over said top and bottom surfaces of the substrate.

15. The optical recording medium of claim 1 further comprising a second prerecorded area wherein user data is provided and adapted to be read from the bottom surface of the first substrate.

16. The optical recording medium of claim 1 wherein predefined wavelength of light is the same light that reads the user data in the prerecorded area.

17. The optical recording medium of claim 1 wherein the prerecorded area is on the top surface.

18. The optical recording medium of claim 1 wherein the photosensitive layer is on the same surface as said prerecorded area.

19. An optical recording medium comprising
   a first substrate with a center mounting hole and having top and bottom surfaces;
   a prerecorded area wherein user data is provided and adapted to be read from at least one of said surfaces of the substrate; and a count area comprising a photosensitive material that when exposed to a predefined wavelength of light of predetermined intensity over a predetermined period of time permanently changes the optical property to form at least a portion of one ring, wherein said at least one portion of each ring corresponds to an authorized copy of the prerecorded area and wherein the photosensitive material is represented by the formula $(Sb_aSn_bX_c)_{100-d}O_d$ where X is an element selected from the group consisting of indium, germanium, aluminum, and zinc; O is oxygen; and d is between 0 and 10; a is between 0.30 and 0.98; b is between 0.0 and 0.48; and c is between 0.02 and 0.60.

20. The optical recording medium of claim 19 wherein the photosensitive material is a dye based material comprising cyanines.

21. The optical recording medium of claim 19 wherein the photosensitive material is a dye based material comprising tellurium leuco dyes.

22. The optical recording medium of claim 19 wherein the photosensitive material is a rare-earth doped alkaline-earth metal sulfide.

23. The optical recording medium of claim 19 further comprising an identification area.

24. The optical recording medium of claim 19 wherein said substrate is a molded plastic.

25. The optical recording medium of claim 24 wherein said molded plastic is polycarbonate.

26. The optical recording medium of claim 19 wherein the photosensitive material is altered photothermally.

27. The optical recording medium of claim 19 wherein a reflective layer is formed over the count area.

28. The optical recording medium of claim 19 further comprising a second substrate with a center mounting hole, a prerecorded area wherein user data is provided and adapted to be read from a top surface of the second substrate, and having a bottom surface wherein said bottom surfaces and mounting holes of said first substrate and said second substrate are aligned and mounted together.

29. The optical recording medium of claim 19 further comprising a plastic transparent layer over said top and bottom surfaces of the substrate.

30. The optical recording medium of claim 19 further comprising a second prerecorded area wherein user data is provided and adapted to be read from the bottom surface of the first substrate.

31. The optical recording medium of claim 19 wherein predefined wavelength of light is the same light that reads the user data in the prerecorded area.

32. The optical recording medium of claim 19 wherein the prerecorded area is on the top surface.

33. The optical recording medium of claim 19 wherein the photosensitive layer is on the same surface as said prerecorded area.

34. An optical recording medium comprising
  a first substrate with a center mounting hole and having top and bottom surfaces; and
  a prerecorded area, wherein user data is provided and adapted to be read from at least one of said surfaces of the substrate, comprising a photosensitive material that when exposed to a predefined wavelength of light of predetermined intensity over a predetermined period of time permanently changes the optical property of the prerecorded area thereby limiting one authorized copy of the prerecorded area and wherein the photosensitive material is represented by the formula $(Sb_aSn_bX_c)_{100-d}O_d$ where X is an element selected from the group consisting of indium, germanium, aluminum, and zinc; O is oxygen; and d is between 0 and 10; a is between 0.30 and 0.98; b is between 0.0 and 0.48; and c is between 0.02 and 0.60.

35. The optical recording medium of claim 34 wherein the photosensitive material is a dye based material comprising cyanines.

36. The optical recording medium of claim 34 wherein the photosensitive material is a dye based material comprising tellurium leuco dyes.

37. The optical recording medium of claim 34 wherein the photosensitive material is a rare-earth doped alkaline-earth metal sulfide.

38. The optical recording medium of claim 34 further comprising an identification area.

39. The optical recording medium of claim 34 wherein said substrate is a molded plastic.

40. The optical recording medium of claim 39 wherein said molded plastic is polycarbonate.

41. The optical recording medium of claim 34 wherein the photosensitive material is altered photothermally.

42. The optical recording medium of claim 34 further comprising a second substrate with a center mounting hole, a prerecorded area wherein user data is provided and adapted to be read from a top surface of the second substrate, and having said bottom surface wherein said bottom surfaces and mounting holes of said first substrate and said second substrate are aligned and mounted together.

43. The optical recording medium of claim 34 further comprising a second prerecorded area wherein user data is provided and adapted to be read from the bottom surface of the first substrate.

44. The optical recording medium of claim 34 wherein predefined wavelength of light is the same light that reads the user data in the prerecorded area.

45. The optical recording device of claim 34 wherein said at least one of said surfaces is the top surface.

46. An optical recording medium comprising
  a first substrate with a center mounting hole and having top and bottom surfaces;
  a prerecorded area wherein user data is provided and adapted to be read from at least one of said surfaces of the substrate; and
  a photosensitive layer formed over a portion of the substrate wherein the portion of the substrate is the prerecorded area and comprises photosensitive material that when exposed to a predefined wavelength of light over a predetermined period of time with a predetermined intensity permanently changes the optical property of at least a portion of the photosensitive layer after each copy of the prerecorded area is made, wherein the optical property of the photosensitive material is changed for each authorized copy, thereby limiting the authorized copies of the prerecorded area to a predetermined number.

47. An optical recording medium comprising
  a first substrate with a center mounting hole and having top and bottom surfaces;
  a prerecorded area wherein user data is provided and adapted to be read from at least one of said surfaces of the substrate; and
  a count area comprising a photosensitive material that when exposed to a predefined wavelength of light of predetermined intensity over a predetermined period of time permanently changes the optical property to form at least a portion of one ring, wherein said at least one portion of each ring corresponds to an authorized copy of the prerecorded area and wherein the photosensitive material is represented by the formula $Te_aGe_bC_cH_dO_e$, wherein a, b, c, d, and e are atomic percents and (c+d)>40, d>10, a>5, b>5, and e≧0 such that a+b+c+d+e=100.

48. An optical recording medium comprising a first substrate with a center mounting hole and having top and bottom surfaces; and a prerecorded area, wherein user data is provided and adapted to be read from at least one of said surfaces of the substrate, comprising a photosensitive material that when exposed to a predefined wavelength of light of predetermined intensity over a predetermined period of time permanently changes the optical property of the prerecorded area thereby limiting one authorized copy of the prerecorded area and wherein the photosensitive material is represented by the formula $Te_aGe_bC_cH_dO_e$ wherein a, b, c, d, and e are atomic percents and (c+d)>40, d>10, a>5, b>5, and e≧0 such that a+b+c+d+e=100.

* * * * *